INVENTORS.
JAMES W. SUTHERLAND
AUGUSTINE O. ALLEN

INVENTORS.
JAMES W. SUTHERLAND
AUGUSTINE O. ALLEN

United States Patent Office 3,002,911
Patented Oct. 3, 1961

3,002,911
RADIOLYSIS OF ORGANIC COMPOUNDS IN THE ADSORBED STATE
James W. Sutherland, Upton, and Augustine O. Allen, Shoreham, N.Y., assignors to the United States of America as represented by the United States Atomic Energy Commission
Filed Oct. 6, 1959, Ser. No. 844,838
3 Claims. (Cl. 204—154)

The present invention relates to methods of converting hydrocarbons into useful products by means of energetic penetrating radiation. More particularly, it relates to a method of utilizing solid substrates for the transfer of energy from the substrate to the adsorbed hydrocarbon to enhance the conversion of hydrocarbon compounds to lower molecular straight chain and branched chain structures.

The irradiation of bulk liquid organic compounds has, in recent years, received extensive investigation. It has been found that highly energetic radiation, such as gamma rays, cause extensive changes in these compounds. For example, olefinic hydrocarbons are readily polymerized when exposed to gamma rays and other penetrating radiation. As little as .1 megaroentgen radiation will convert saturated hydrocarbons (alkanes) to dimeric fractions, an olefinic fraction and a gaseous product consisting principally of methane and hydrogen. The radiolysis, however, of organic compounds in the adsorbed state has not been studied to a great extent.

It is an object of the present invention to improve the properties of certain solid substrates for use in converting organic compounds into useful chemical products.

A further object of the invention is to activate solid substrates for use in converting straight chain paraffin hydrocarbons (alkanes) to lower or same molecular weight straight chain and branched chain alkanes.

Still another object of the present invention is to alter the ratio of various chemical products produced by the radiation of organic compounds as compared to the ratio of products produced from their exposure in the ordinary liquid form.

The principal object of the present invention is to improve the properties of solid substrates.

Other objects will in part be obvious and will in part be pointed out hereinafter.

The advantages of the present invention will be more readily apparent by reference to the following examples when taken in connection with the accompanying figures in which.

Figure 1:
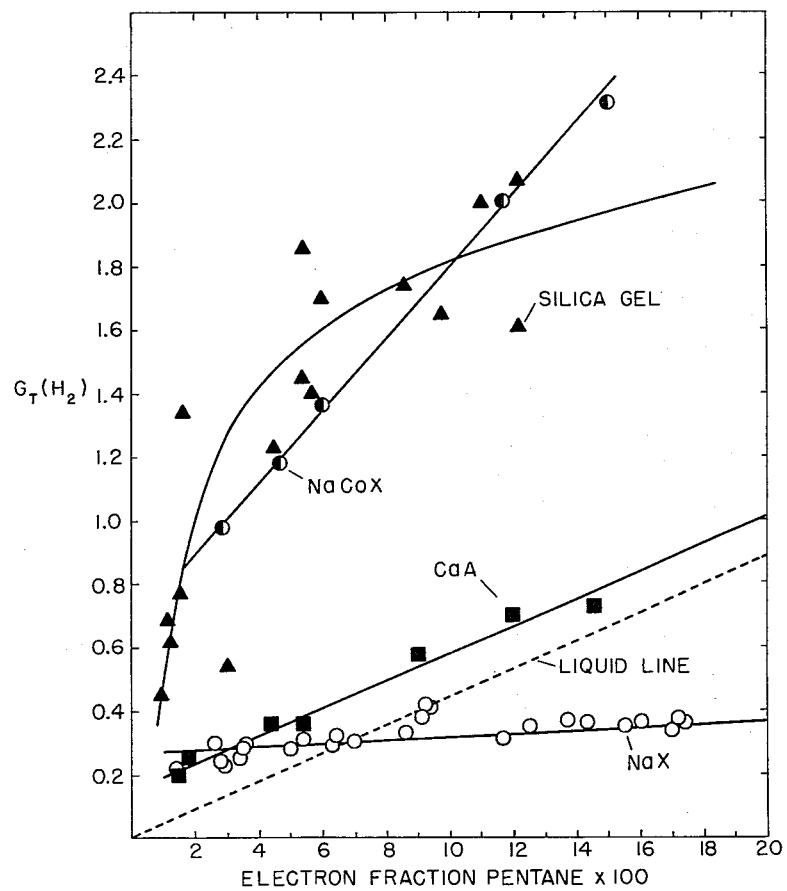
FIGURE 1 is a graph of the hydrogen yields obtained with various substrates.

As used in the following description, penetrating radiation will be understood to include energetic electromagnetic radiation capable of penetrating the materials treated. Neutrons of thermal energy and above, particle beams and X-rays produced in high energy electrical devices, such as electron accelerators and the like, and radiation from radioactive sources are included in this term.

This invention relates to the radiolysis of adsorbed pentane which is readily distributed over a solid powder by distillation.

In accordance with this invention, we have found that when a solid zeolite substrate is admixed with a cobalt ion and the then formed ion-exchange zeolite is irradiated, after the hydrocarbon is adsorbed therein, an unexpected increase in the yield of branched and lower molecular straight chain compounds results. It has been found that there is an increase in the products produced with an increase in the amount of hydrocarbon distilled onto the solid substrate. The following examples are illustrative of the method of the present invention as it applies to the radiolysis of hydrocarbon compounds. Unless otherwise indicated, all the examples were conducted at room temperature (i.e., at a temperature of about 25° C. to 27° C.).

EXAMPLE I

Ion-exchange zeolite forms were prepared by stirring 30 grams of $Na_2O.Al_2O_3.2.67SiO_2$ with 100 cc. of a solution of cobalt, containing approximately twice as much metal ion as would be equivalent to the sodium in the zeolite, for two days at room temperature. The zeolite crystalline particles had a diameter of about 3 microns. Zeolite powder, such as "Molecular Sieve 13X" obtained from the Linde Co. can be used. The crystalline zeolite particles of $Na_2O.Al_2O_3.2.67SiO_2$ have structures essentially of a series of cavities, the largest of which are connected together to form long tunnels through the material, which have a maximum width of about 20 A. and a minimum width of about 9 A. These cavities contain sodium ions which are readily replaceable by uni- or divalent ions. After the two days, the solid was filtered off and then washed with six portions of distilled water. This ion-exchange solid substrate prepared by using $Na_2O.Al_2O_3.2.67SiO_2$ is hereinafter referred to as NaCoX.

All results are calculated using the weight of outgassed material. Four to five grams of solid was placed in a Pyrex tube 1.0 cm. I.D. and about 13 cm. long, fitted with a breakseal. The material was sealed onto a vacuum line and outgassed at 420°–450° C. for four or five days, until the residual pressure was less than $2 \times 10^{-5}$ mm. Hg. The material was then essentially free of water. NaCoX was then irradiated. A known quantity of pentane (Phillips Research grade having a stated purity of 99.8%) was distilled into the solid from a calibrated volume, and the tube was sealed off under liquid nitrogen. Greaseless valves were used throughout the vacuum system.

The amount of gas obtained upon removal by heating to 400° C., according to the regular desorption procedure, as stated hereafter, was then determined and analyzed by combustion over copper oxide. Table I shows the results of these blank runs.

EXAMPLE II

Silica gel, and untreated $Na_2O.Al_2O_3.2.67SiO_2$ hereinafter referred to as NaX, were used as the solid substrates of Example I. The amount of gas obtained upon removal by heating to 400° C., according to the regular desorption procedure was then determined. Table I shows the results of these runs.

TABLE I
*Results of Blank Determinations*

| Solid | Treatment | Hydrogen Yield,[a] moles gas [b] |
|---|---|---|
| Silica gel | Outgassed. Irradiated in vacuo | 0.06 |
| | Outgassed. n-Pentane adsorbed. Desorbed: | |
| | (a) 1.78% n-Pentane | 0.45 |
| | (b) 6.83% n-Pentane | 0.11 |
| | Outgassed. Irradiated in vacuo. n-Pentane adsorbed. Desorbed: | |
| | (a) 2.17% n-Pentane | 1.6 |
| | (b) 8.91% n-Pentane | 1.3 |
| Max | Outgassed. Irradiated in vacuo | 0.07 |
| | Outgassed. n-Pentane adsorbed. Desorbed: | |
| | (a) 2.31% n-Pentane | 0.65 |
| | (b) 13.1% n-Pentane | 1.2 |
| | Outgassed. Irradiated in vacuo. n-Pentane adsorbed. Desorbed: | |
| | (a) 6.0% n-Pentane | 1.3 |
| | (b) 11.9% n-Pentane | 1.6 |
| NaCoX | Outgassed. Irradiated in vacuo | 0.08 |
| | Outgassed. Irradiated in vacuo. n-Pentane adsorbed. Desorbed: | |
| | (a) 6.5% n-Pentane | 0.35 |
| | (b) 10.7% n-Pentane | 0.36 |

[a] Where yields of gas were too low to determine hydrogen the total gas yields are given.
[b] In typical runs hydrogen yields from n-pentane solid system ranged as follows:

| | Moles |
|---|---|
| Silica gel | 60–217 |
| NaX | 14–28 |
| NaCoX | 60–155 |

As can be seen from Table I, the amount of gas obtained from the runs, as set forth in Examples I and II was always negligible as compared to the quantity obtained when pentane in liquid bulk is exposed to irradiation. The effect studied here thus depends on the pentane and solid being irradiated together, which is illustrated in Example III. It is not due to an activation of the solid by radiation to a catalytically active state which itself can decompose pentane without the radiation being present.

EXAMPLE III

After a known quantity of pentane is distilled into an ion-exchange substrate (as prepared in Example 1), NaX or silica gel and sealed off under liquid nitrogen as in Example I, irradiations were performed with gamma rays from $^{60}$Co at 25° C. The dose rates were 0.25–0.35 megaroentgens (Mr) per hour. Total doses used were 17.0 Mr for the runs using silica gel and 21.6 Mr for all others.

Untreated $Na_2O \cdot 3CaO \cdot 4Al_2O_3 \cdot 8SiO_2$, hereinafter referred to as CaA, was also irradiated following the procedure as set forth above. This zeolite powder has a diameter of about 3 microns with a structure similar to $Na_2O \cdot Al_2O_3 \cdot 2.67SiO_2$. However, the largest channel in its structure has a minimum diameter of only 5 A. Zeolite powder, such as "Molecular Sieve 5 A." obtained from the Linde Co. can be used.

After irradiation, the tubes were broken open under vacuum and the gaseous products pumped through a liquid nitrogen trap into a McLeod gauge. The temperature of the sample, which was initially that of the room, was gradually increased to 400° C. where it was maintained for two hours to insure as thorough removal of radiolysis products as possible.

Figure 2:
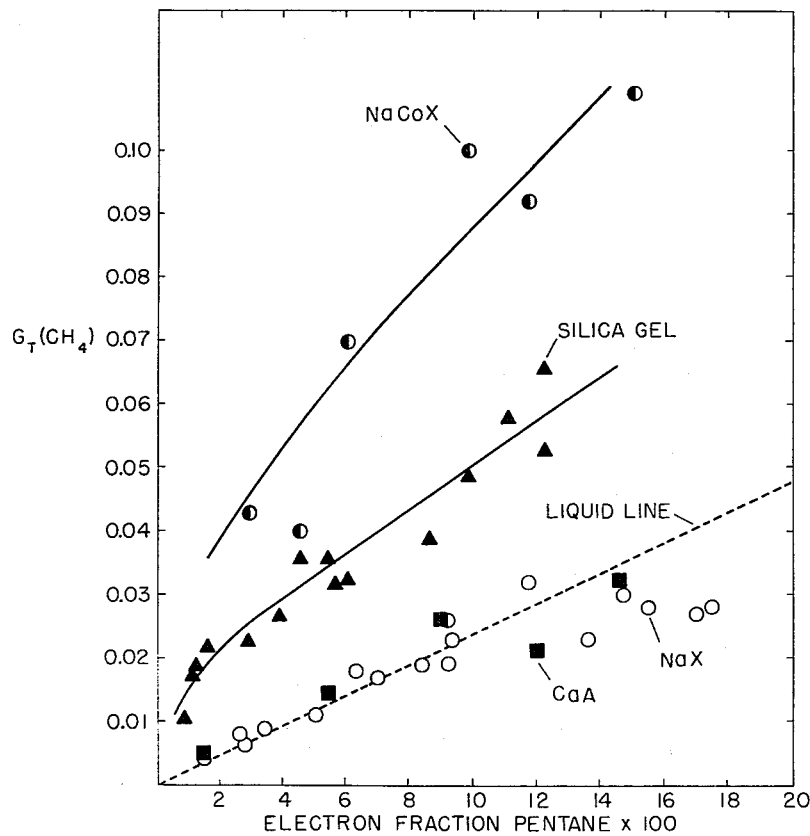
FIGURE 2 is a graph of the methane yields obtainable with various substrates.

At least 95% of the permanent gas came over below 200° C. The gas, which contained only hydrogen and methane, was analyzed by combustion over copper oxide. In the runs with CaA structures, it was observed, as shown in FIGURES 1 and 2, that there was only a slight variation from results obtained upon irradiation of bulk liquid pentane. It is quite possible that although pentane molecules readily penetrate the structure, the radiolysis products of pentane may be sterically unable to get out. The fraction of pentane decomposed in the other runs amounted to at most 3.5%, and was much less in the majority of runs, so that the liquid product recovered was mainly undecomposed n-pentane. Aliquots of the liquid product were taken in micropipettes, the temperature during sampling being kept at −78° C. to avoid loss of volatile products. Analysis was performed by gas-liquid partition chromatography on a Perkin-Elmer "vapor fractometer" Model 154 using a 4-meter "UCON" column (polypropylene glycol). Calibration was performed by passing through known quantities of the various hydrocarbons under the same conditions of temperature and flow rate used in the radiation product analyses.

Data for the irradiations are expressed in terms of $G_T$, the number of molecules of product formed for each 100 e.v. of energy absorbed by the total system of solid plus pentane. These values are presented for each product as a function of the electron fraction of pentane in the mixture. Electron fraction is used rather than weight or mole fraction because it is believed that the initial deposition of the energy by the radiation in each component of a mixture is nearly proportional to the electron fraction of the component. It has been found from the studies of radiolysis on bulk pentane that if there were no interaction between pentane and solid, and the specific radiolysis yield would be the same in the adsorbed state as in liquid pentane, then a plot of $G_T$ for each product against the electron fraction of pentane would be a straight line running from the origin to the liquid G value at 100% pentane. This line is shown in the figures and is called the "liquid line." When a yield lies above the liquid line, it means that the amount of product formed by exposure of adsorbed pentane to a given dose of gamma rays is greater than would be obtained from exposure of the same quantity of pentane in the ordinary liquid form to the same dose of gamma rays.

Figure 3:
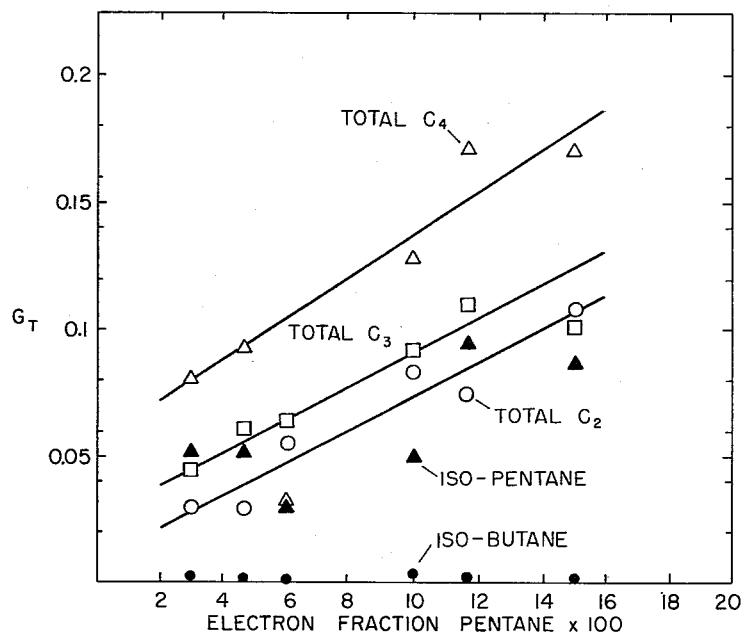
FIGURE 3 is a graph of the lower hydrocarbon yields formed by use of the substrate of this invention.
Figure 4:
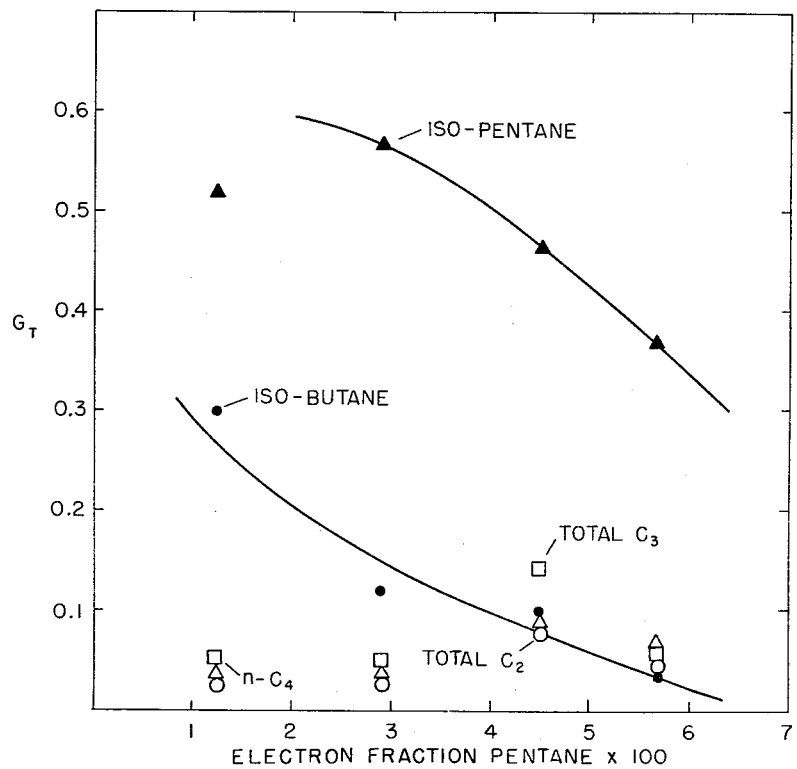
FIGURE 4 is a graph of the lower hydrocarbon yields formed by use of the substrate silica gel.

The hydrogen yields and the methane yields obtained from Example III on the solid NaCoX are shown in FIGURES 1 and 2, respectively. The very high yields obtained on NaCoX probably indicate that a great deal of energy transfer occurs from the solid to the adsorbed pentane. FIGURE 3 shows the yields of lower hydrocarbons obtained from NaCoX. The relative amount of isopentane is somewhat greater than in the radiolysis of bulk liquid pentane but the amount of chain branching is not very great. From the results obtained where silica gel is used as a substrate, as seen in FIGURE 4, it is noted that a much higher yield of branched chain product (isopentane and isobutane) is obtainable. There is, however, in these experiments a very definite fall in the total amount of products as the percentage of pentane on the gel substrate is increased. This means (a) that the first portion of the pentane to go on the silica gel shows a high yield of isomerization of the carbon chain under radiation; (b) when more pentane is put on, not only does this additional pentane not undergo isomerization, but its presence actually prevents the occurrence of this reaction in the more tightly bound molecules. The isomerization reaction probably occurs only with more or less isolated molecules of pentane on the silica surface and is quenched in some way by presence of neighboring pentane molecules.

When using NaCoX, the substrate of this invention, it is seen that increased concentration of pentane adsorbed on the NaCoX zeolite tends to increase the yield of branched chain compounds as illustrated in FIGURE 3.

Not enough experimental results are available as yet in this field to obtain a good insight into the molecular mechanism of the process, and it is not intended that any theoretical explanation shall be binding. It seems probable that the reactions are not, strictly speaking, "catalytic," which would imply that the energy for the process is obtained from the thermal energy of the surroundings, and the function of the radiation is merely to bring the reactant into a favorable position for thermodynamically allowed processes to occur. Rather, the radiation provides the energy, which may migrate from the solid to the organic molecules by some mechanism or other. Thus the overall chemical changes occurring are not restricted to those allowed by the rules of thermodynamic equilibrium.

One possible mechanism for energy transfer consists of the motion through the solid of the so-called "sub-excitation" electrons, which have energies far above thermal but still below the lowest electronic energy level present in the material. Such electrons can lose their energy only relatively slowly in the material. They may presumably travel considerable distances, if they can escape capture by the positive charges or "holes" formed by the irradiation along with the electrons. If such electrons reach the surface they might still have energy enough to excite the pentane molecules to upper electronic states, if such states exist in pentane at lower energy levels than the lowest excited energy level present in the solid. On this theory we would expect the existence of low-lying levels in the solid to decrease the yield of pentane decomposition. This certainly does not agree with the finding of very much more decomposition on NaCoX. Another possible mechanism of energy transfer, however, is the migration of positive charges or holes in the electron distribution through the solid to the pentane, which would then become ionized. This mechanism is perhaps somewhat more likely than the sub-excitation electron mechanism, since it is quite possible that the cobalt ions could in some way facilitate transfer of positive charge to the pentane. We have no explanation for the sharp difference between the silicate and cobalt preparations.

Since many embodiments might be made in the present invention, and since many changes might be made in the embodiment described, it is to be understood that the foregoing description is to be interpreted as illustrative only and not in a limiting sense.

We claim:
1. A method of radiolysis of an alkane hydrocarbon in the adsorbed state whereby there is an increase in the yield of branched chain hydrocarbons by increasing the amount of alkane hydrocarbon in the adsorbed state, the steps of which comprise preparation of ion-exchange forms by combining a zeolite with cobalt ions, adsorbing said alkane hydrocarbon on the ion-exchange forms, irradiating said ion-exchange forms with high energy ionizing radiation sufficient to cause the production of branched chain hydrocarbons and thereafter recovering the products.

2. The method of claim 1 wherein the zeolite has the formula $Na_2O \cdot Al_2O_3 \cdot 2.67SiO_2$.

3. The method of claim 1 wherein the zeolite is a series of particles having structures essentially of a series of cavities, the largest of which are connected together to form long tunnels through the material, which have a maximum width of about 20 A. and a minimum width of about 9 A.

References Cited in the file of this patent

UNITED STATES PATENTS

| | | |
|---|---|---|
| 2,798,857 | Kimberlin et al. | July 9, 1957 |
| 2,904,484 | Houston et al. | Sept. 15, 1959 |
| 2,905,607 | Long et al. | Sept. 22, 1959 |
| 2,906,713 | Hunter et al. | Sept. 29, 1959 |
| 2,955,997 | Allen et al. | Oct. 11, 1960 |

OTHER REFERENCES

Caffrey et al.: Journal of Physical Chemistry, vol. 62 (January 1958), pp. 33–37.